May 22, 1962 R. W. PARKER ET AL 3,035,848
LAWN MACHINE

Original Filed July 12, 1956 2 Sheets-Sheet 2

INVENTORS
RICHARD W. PARKER
& EDWIN F. OBLINGER
BY

ATTORNEYS

United States Patent Office 3,035,848
Patented May 22, 1962

3,035,848
LAWN MACHINE
Richard W. Parker and Edwin F. Oblinger, Springfield, Ohio, assignors to Parker Sweeper Company, Springfield, Ohio, a corporation of Ohio
Original application July 12, 1956, Ser. No. 603,855, now Patent No. 2,945,249, dated July 19, 1960. Divided and this application Apr. 11, 1960, Ser. No. 21,555
1 Claim. (Cl. 280—79.2)

The present invention is a division of our co-pending application Serial Number 603,855, filed July 12, 1956, now Patent No. 2,945,249, issued July 19, 1960, and relates to lawn machines and more particularly to the debris receptacle used on such machines.

Some lawn machines, such as lawn sweepers or lawn mowers, employ debris-receiving baskets or receptacles. Such receptacle usually trails the sweeper or mower. Such basket or receptacle usually includes a sheet metal lower wall or floor and cloth side and rear walls. A basket or receptacle of this type, particularly in a lawn sweeper, is provided with rear wheels or rollers which ride on the ground and support the debris receptacle.

Our invention contemplates a novel construction in which the rear end of the floor of the debris receptacle forms a loop; this loop receives a rod which forms an axle for the wheels or roller; the lower end of the cloth back of the receptacle is interposed, in binding relationship, between the periphery of the rod and the inside wall of the loop, and is thus held in position.

The advantages will be apparent from the following description, reference being had to the accompanying drawings wherein a preferred embodiment of the invention is illustrated.

Figure 1:
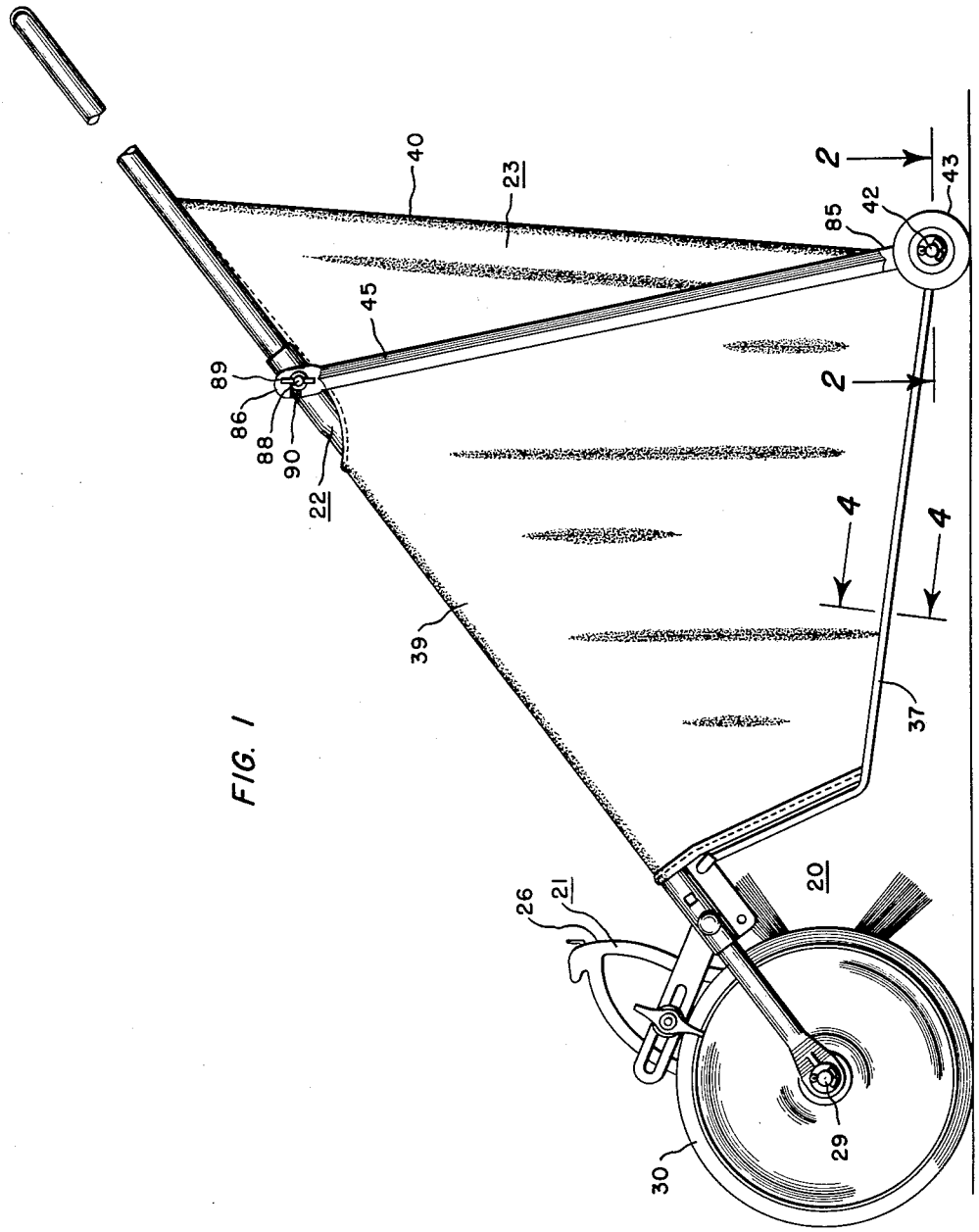
Figure 2:
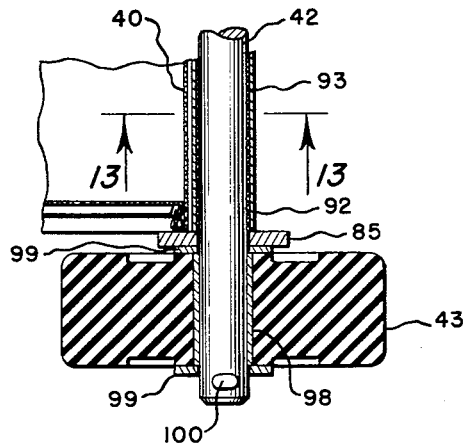
Figure 3:
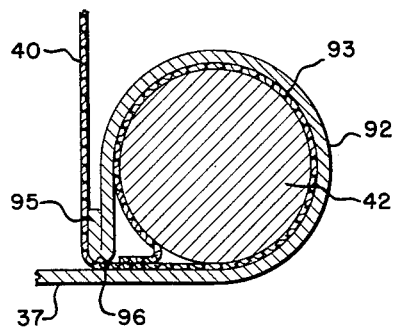
Figure 4:
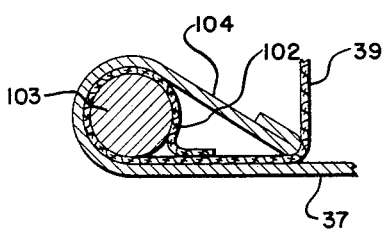

In the drawings:
FIG. 1 is a side view of the debris receptacle as applied to a lawn sweeper;
FIG. 2 is a sectional view taken along line 2—2 of FIG. 1, but on a larger scale;
FIG. 3 is a sectional view taken along line 3—3 of FIG. 2, but on a larger scale; and
FIG. 4 is a fragmentary sectional view taken along line 4—4 of FIG. 1, but on a larger scale.

Referring to the drawings, the sweeper 20 comprises a main frame 21, a handle 22 and a debris receptacle 23. The main frame 21 includes side plates, allochiral with respect to one another, one of which is shown at 26. These side plates are connected with one another by a hood, as is more clearly shown in the aforementioned divisional application. The side plates each carry an axle 29 for supporting the two wheels, one of which is shown at 30 on the outside of the side plates.

The handle 22 is inverted U-shaped and the lower ends are connected with the frame 21 at the axle 29. The debris receptacle 23 includes a sheet metal bottom wall or floor 37, opposite side walls, one of which is shown at 39, and a rear wall 40. These walls 39 and 40 are formed of cloth, such as heavy canvas. The rear of the floor 37 carries an axle 42 and this axle carries wheels or rollers 43, disposed on opposite sides of the receptacle 23.

Braces 45 extend from the axle 42 to the handle 22 for holding the handle and debris receptacle in upright position. The lower ends 85 of the braces 45 are pivotally supported on the axle 42 of the debris receptacle 22. The upper ends 86 of the braces 45 are detachably secured to the handle 22 through bolts 88 and wing nuts 89. By detaching the braces 45 from the handle 22, the basket or debris receptacle can be collapsed without removing the receptacle from the handle; by providing such collapsing, less space is required for storing the machine. The openings 90 in the upper end of the braces 45 are in the form of open slots whereby the braces can be removed from the bolts by merely loosening the wing nuts, i.e., the wing nuts or bolts need not be removed.

Referring now, particularly, to FIGS. 2 and 3, the sheet metal floor 37 of the debris receptacle is formed with a loop 92 at the extreme rear. The bottom edge 93, in the form of a loop or hem, of the canvas back 40, is disposed within the loop 92. Axle 42 is disposed within the hem 93. The loop 92 is of such size so as to snugly embrace the material of the hem 93 when the axle 42 is in position. The resiliency of the metal of the loop is sufficient to clamp the loop 93 tightly between the axle 42 and the inner wall of the loop, thus preventing turning of the axle 42. It will be noted that the extreme end of the metal forming the floor 37 is bent back on itself, as at 95, to present a smooth, rounded surface 96 to the cloth of the back 40.

Thus the rod 42 not only forms an axle for wheels 43, but also cooperates with the floor 37 to form a retainer for the bottom of the back 40.

As seen from FIG. 2, each of the wheels includes the bearing 98 for axle 42. Washers 99 are disposed on opposite sides of the wheels. Cotter keys 100 extend through holes at the outer end of the axle to hold the wheels in place.

The bottoms of the side walls 39 of the debris receptacle 23 are provided with loops or hems 102, each receiving a wire 103. The side edges of the sheet metal floor (see FIG. 4) are folded, as at 104, over the hem and the wire therein, to tightly fasten the hem to the floor.

While the form of embodiment herein shown and described constitutes a preferred form, it is to be understood that other forms may be adopted falling within the scope of the claim that follows.

We claim:
In combination, walls including a bottom forming a debris receptacle for a lawn machine, said bottom wall being of sheet metal having a loop; an axle disposed in the loop, the rear wall of the receptacle being formed of cloth and having the lower end interposed in binding relationship between the periphery of the axle and the inside wall of the loop, said axle extending beyond opposite sides of the bottom wall; and wheels rotatably carried on opposite ends of the axle.

References Cited in the file of this patent
UNITED STATES PATENTS

| | | |
|---|---|---|
| 1,917,782 | Vachon | July 11, 1933 |
| 2,256,107 | Zadek | Sept. 16, 1941 |
| 2,610,071 | Davis | Sept. 9, 1952 |
| 2,654,106 | Parker | Oct. 6, 1953 |
| 2,768,022 | Pope | Oct. 23, 1956 |